United States Patent
Jung et al.

(10) Patent No.: US 11,482,134 B2
(45) Date of Patent: Oct. 25, 2022

(54) METHOD, APPARATUS, AND TERMINAL FOR PROVIDING SIGN LANGUAGE VIDEO REFLECTING APPEARANCE OF CONVERSATION PARTNER

(71) Applicant: KOREA ELECTRONICS TECHNOLOGY INSTITUTE, Seongnam-si (KR)

(72) Inventors: Hye Dong Jung, Seoul (KR); Sang Ki Ko, Suwon-si (KR); Han Mu Park, Seongnam-si (KR); Chang Jo Kim, Suwon-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 652 days.

(21) Appl. No.: 16/536,151

(22) Filed: Aug. 8, 2019

(65) Prior Publication Data

US 2021/0043110 A1     Feb. 11, 2021

(30) Foreign Application Priority Data

Aug. 6, 2019    (KR) .......................... 10-2019-0095581

(51) Int. Cl.
*G09B 21/00* (2006.01)
*G06T 11/00* (2006.01)
(Continued)

(52) U.S. Cl.
CPC ............ *G09B 21/009* (2013.01); *G06T 11/00* (2013.01); *G06V 40/174* (2022.01); *G06V 40/20* (2022.01);
(Continued)

(58) Field of Classification Search
CPC ....... G09B 21/009; G06T 11/00; G06T 11/60; G06V 40/174; G06V 40/20; G06V 20/20;
(Continued)

(56) References Cited

U.S. PATENT DOCUMENTS 5,659,764 A * 8/1997 Sakiyama ............ G09B 21/009
                                                                345/473
5,734,923 A * 3/1998 Sagawa ................... G06T 11/60
                                                                715/204
(Continued)

FOREIGN PATENT DOCUMENTS

JP    2016-62528 A    4/2016
JP    2017-204067 A   11/2017
(Continued)

OTHER PUBLICATIONS

Office Action received in corresponding Korean Patent Application No. 10-2019-0095581 dated Nov. 29, 2019, 12 pages.

*Primary Examiner* — Thuykhanh Le
(74) *Attorney, Agent, or Firm* — Knobbe, Martens, Olson & Bear, LLP

(57) ABSTRACT

Disclosed is a method of providing a sign language video reflecting an appearance of a conversation partner. The method includes recognizing a speech language sentence from speech information, and recognizing an appearance image and a background image from video information. The method further comprises acquiring multiple pieces of word-joint information corresponding to the speech language sentence from joint information database, sequentially inputting the word-joint information to a deep learning neural network to generate sentence-joint information, generating a motion model on the basis of the sentence-joint information, and generating a sign language video in which the background image and the appearance image are synthesized with the motion model. The method provides a natural communication environment between a sign language user and a speech language user.

14 Claims, 6 Drawing Sheets

(51) Int. Cl.
*G10L 15/22* (2006.01)
*G10L 15/24* (2013.01)
*G10L 25/63* (2013.01)
*G10L 25/90* (2013.01)
*G06V 40/20* (2022.01)
*G06V 40/16* (2022.01)

(52) U.S. Cl.
CPC .............. *G10L 15/22* (2013.01); *G10L 15/24* (2013.01); *G10L 25/63* (2013.01); *G10L 25/90* (2013.01)

(58) Field of Classification Search
CPC ......... G06V 40/28; G10L 15/22; G10L 15/24; G10L 25/63; G10L 25/90; G10L 25/30; G10L 21/10; G06F 3/017
USPC ........................................................ 434/112
See application file for complete search history.

(56) References Cited

U.S. PATENT DOCUMENTS

| | | | | |
|---|---|---|---|---|
| 6,181,778 | B1* | 1/2001 | Ohki | H04N 21/4884 348/704 |
| 9,338,394 | B2* | 5/2016 | Li | H04L 12/1827 |
| 10,489,032 | B1* | 11/2019 | Margolin | G06F 21/6245 |
| 10,607,069 | B2* | 3/2020 | Shahar | G06V 10/34 |
| 2002/0031262 | A1* | 3/2002 | Imagawa | H04N 21/41407 348/E7.078 |
| 2009/0110292 | A1* | 4/2009 | Fujimura | G06F 3/017 382/203 |
| 2009/0158136 | A1* | 6/2009 | Rossano | H04L 61/4594 715/810 |
| 2013/0100166 | A1* | 4/2013 | Nonaka | G06T 11/60 345/636 |
| 2013/0311528 | A1* | 11/2013 | Liebermann | G06F 40/58 707/899 |
| 2014/0046661 | A1* | 2/2014 | Bruner | H04N 21/6582 704/235 |
| 2014/0081634 | A1* | 3/2014 | Forutanpour | G06F 40/58 704/235 |
| 2014/0310610 | A1* | 10/2014 | Ricci | B60C 1/00 715/744 |
| 2015/0120293 | A1* | 4/2015 | Wohlert | G10L 13/02 704/235 |
| 2015/0317304 | A1* | 11/2015 | An | G10L 15/26 386/285 |
| 2015/0331493 | A1* | 11/2015 | Algreatly | G06F 3/005 345/156 |
| 2016/0062987 | A1* | 3/2016 | Yapamanu | H04M 3/42 704/2 |
| 2016/0155362 | A1* | 6/2016 | Joshi | G09B 21/009 434/112 |
| 2017/0236450 | A1* | 8/2017 | Jung | G10L 15/26 704/3 |
| 2018/0357472 | A1* | 12/2018 | Dreessen | G06V 40/23 |
| 2018/0374477 | A1* | 12/2018 | Kim | G10L 15/063 |
| 2019/0171716 | A1* | 6/2019 | Weber | H04N 7/15 |
| 2019/0251344 | A1* | 8/2019 | Menefee | G06V 40/165 |
| 2019/0251702 | A1* | 8/2019 | Chandler | G06N 3/08 |
| 2019/0341055 | A1* | 11/2019 | Krupka | G10L 25/84 |
| 2020/0075011 | A1* | 3/2020 | Yao | G06V 40/171 |
| 2020/0081909 | A1* | 3/2020 | Li | G06N 20/00 |
| 2020/0159833 | A1* | 5/2020 | Natesan | G10L 21/06 |
| 2020/0193217 | A1* | 6/2020 | Shen | G06N 20/20 |
| 2021/0150145 | A1* | 5/2021 | Negishi | G06F 3/017 |
| 2021/0344991 | A1* | 11/2021 | Todd | H04N 21/4622 |
| 2021/0377593 | A1* | 12/2021 | Kwon | G06F 3/0482 |
| 2022/0036050 | A1* | 2/2022 | Chandler | G06F 3/013 |
| 2022/0121884 | A1* | 4/2022 | Zadeh | G06K 9/6264 |

FOREIGN PATENT DOCUMENTS

| | | |
|---|---|---|
| JP | 6291265 B2 | 3/2018 |
| KR | 10-2010-0026701 A | 3/2010 |

* cited by examiner

METHOD, APPARATUS, AND TERMINAL FOR PROVIDING SIGN LANGUAGE VIDEO REFLECTING APPEARANCE OF CONVERSATION PARTNER

CROSS REFERENCE TO RELATED APPLICATION

The present application claims priority to Korean Patent Application No. 10-2019-0095581, filed Aug. 6, 2019, the entire contents of which is incorporated herein for all purposes by this reference.

BACKGROUND

Technical Field

The present disclosure relates to a method, apparatus, and terminal for providing a sign language video reflecting an appearance of a conversation partner.

Related Art

Sign language is one of the most representative methods used to communicate an opinion to deaf people, and is a way of communicating the opinion through gestures. Sign language has its own grammar and expresses the sentence by continuously performing gestures with the specified meaning. The grammar of sign language differs from the grammar of speech language, which is expressed by voice and text. Therefore, most of the listeners have difficulty in communicating with the a person by using sign language because the listeners must take professional education for a long time in order to express sign language without inconvenience. In order to solve this difficulty in communication, it is essential to have a technique to translate the speech language familiar to the listener into a language familiar to the deaf person.

In recent years, there has been developed a sign language translator that converts characters into words and visually displays them, or recognizes and displays sign language as characters. When translating the characters into sign language and displaying the result visually in the related art, there is a technique of sequentially reproducing videos expressing a sign language word, or providing a video in which a human character performs a defined sign language. Using such a technique, a sign language user cannot look at the conversation partner because the user needs to view the display screen. In addition, since the character or person displayed on the display screen differs from the person who actually talks, it is not possible to provide a natural conversation environment. In addition, since a sign language sentence is generated in such a manner as to simply arrange images corresponding to sign language words, there is a problem that connection between images is not natural.

SUMMARY

The present disclosure has been made keeping in mind the above problems occurring in the related art, and the present disclosure has an objective to provide a method, apparatus, and terminal for providing sign language video, which are capable of generating a natural sign language video using joint information indicating movements of a joint of a body in coordinates, in which word joint information corresponding to sign language word are naturally connected to generate sentence-joint information corresponding to sign language sentence.

Another object according to an embodiment of the present invention is to provide a method, apparatus, and terminal for providing sign language video, capable of providing a sign language video reflecting an appearance of a conversation partner to sign language user using a wearable terminal, in an augmented reality method.

Further, another object according to an embodiment of the present invention is to provide a method, apparatus, and terminal for providing a sign language video, capable of recognizing a non-linguistic expression of a speech language user and reflect the same on a speech language image, thereby conveying both of the language meaning and non-linguistic meaning expressed by the speech language user.

Further, another object according to an embodiment of the present invention is to provide a method, apparatus, and terminal for providing a sign language video, capable of storing an appearance image of a conversation partner or an appearance image of a general person in advance and generating a sign language video using the appearance image store in advance when a body of the conversation partner is not photographed by a camera.

A method of providing a sign language video reflecting an appearance of a conversation partner according to an embodiment of the present invention includes: a recognition step of recognizing a speech language sentence from speech information, and recognizing an appearance image and a background image from video information; a sign language joint information generation step of acquiring multiple pieces of word-joint information corresponding to the speech language sentence from joint information database and sequentially inputting the word-joint information to a deep learning neural network to generate sentence-joint information; and a video generation step of generating a motion model on the basis of the sentence-joint information, and generating a sign language video in which the background image and the appearance image are synthesized with the motion model.

In addition, the sign language joint information generating step may include: a joint information acquisition step of acquiring one or more pieces of word-joint information corresponding to one or more sign language words having a same meaning as the speech language sentence from joint information database based on sign language grammar; and receiving one or more pieces of word-joint information acquired in the joint information acquisition step to generate the sentence-joint information by using a deep learning neural network learned with learning data of which input data includes word-joint information and correct data is the sentence-joint information.

In addition, the video generation step may include: a motion model generation step of generating a motion model moving according to the sentence-joint information; a background image synthesis step of synthesizing the background image on a background of the motion model; and an appearance image synthesis step of synthesizing the appearance image with the motion model.

In addition, the appearance image synthesis step may include, when a part of a body of the conversation partner is not included in the appearance image, synthesizing all or a part of a conversation partner's appearance image or a basic appearance image previously stored on the motion model.

In addition, the recognition step may further include recognizing speech-based non-linguistic information from the speech information and recognizing video-based non-linguistic information from the video information, and the sentence-joint information generation step includes receiving one or more pieces of word-joint information acquired in the joint information acquiring step, the speech-based non-linguistic information, and the video-based non-linguistic information to generate the sentence-joint information, by using a deep learning neural network learned with learning data of which input data further includes the speech-based non-linguistic information and the video-based non-linguistic information, and correct data is the sentence-joint information reflecting the speech-based non-linguistic information and the video-based non-linguistic information.

In addition, the method of providing the sign language video reflecting the appearance of the conversation partner according to an embodiment of the present invention may, further include: before the recognition step, a speech language acquisition step of receiving, in real time, the video information generated by photographing the conversation partner who speaks a speech language by a terminal worn by the sign language user and the speech information generated by receiving the speech language delivered by sound, from the terminal; and after the video generation step, an augmented reality providing step of transmitting the sign language video to the terminal worn by the sign language user in real time to provide the same to the sign language user in an augmented reality method so that the sign language video generated in the video generation step is visually displayed to the sign language user.

In addition, the word-joint information and the sentence-joint information may include one or more pieces of unit-joint information including coordinates of multiple feature points of a human body necessary for reproducing gestures according to an order.

An apparatus for providing a sign language video reflecting an appearance of a conversation partner according to an embodiment of the present invention includes: a recognition module recognizing, on the basis of video information and speech information, an appearance image and a background image from the video information and a speech language sentence from the speech information; a joint information generation module acquiring multiple pieces of word joint information corresponding to the speech language sentence and sequentially inputting the word-joint information to a deep learning neural network to generate sentence-joint information; and a video generation module generating a motion model on the basis of the sentence-joint information, and generating a sign language video in which the background image and the appearance image are synthesized with the motion model.

In addition, the joint information generation module may include: a joint information database storing word-joint information for reproducing a gesture representing a sign language word; a joint information acquisition unit acquiring one or more word-joint information corresponding to one or more sign language words having a same meaning as the speech language sentence from the joint information database based on sign language grammar; and a sentence-joint information generation unit receiving one or more pieces of word-joint information acquired in the joint information acquisition unit to generate the sentence-joint information by using a deep learning neural network learned with learning data of which input data includes word-joint information and correct data is sentence-joint information.

In addition, the recognition module may further recognize speech-based non-linguistic information from the speech information, and further recognize video-based non-linguistic information from the video information, and the sentence-joint information generation unit may receive one or more pieces of word-joint information acquired in the joint information acquiring unit, the speech-based non-linguistic information, and the video-based non-linguistic information to generate the sentence-joint information, by using a deep learning neural network learned with learning data of which input data further includes speech-based non-linguistic information and video-based non-linguistic information, and correct data is the sentence-joint information reflecting the speech-based non-linguistic information and the video-based non-linguistic information.

In addition, the video generation module may synthesize all or a part of a conversation partner's appearance image or a basic appearance image previously stored on the motion model when a part of the body of the conversation partner is not included in the appearance image.

In addition, the speech-based non-linguistic information may be information quantified by recognizing at least one of an intonation, a pitch, a volume, and a speed of a speech language, and the video-based non-linguistic information may be information quantified by recognizing at least one of a type of emotion, a balance of positive and negative, and an excitement on the basis of a facial expression or a gesture appearing in the appearance image of the video information.

In addition, the video information and the speech information may be data provided by a terminal worn by a sign language user in real time, and generated by causing the terminal to photograph the conversation partner and record his/her voice, and the video generation module may provide the sign language video to the terminal worn by the sign language user so that the sign language video is reproduced in real time on the terminal worn by the sign language user.

A terminal for providing a sign language video reflecting an appearance of a conversation partner according to an embodiment of the present invention includes: a speech language acquisition unit generating video information by photographing a conversation partner that speaks a speech language, generating speech information by receiving a speech language transmitted by sound, and delivering the video information and the speech information to a sign language video providing apparatus in real time; and an augmented reality providing unit receiving, in real time, a sign language video reflecting an appearance of the conversation partner generated on the basis of the video information and the sound information from the sign language video providing apparatus and visually displaying the sign language video to the sign language user in an augmented reality method.

In addition, the sign language video may be an video generated by allowing a recognition module of the sign language video providing apparatus to recognize an appearance image and a background image from the video information and recognize a speech language sentence from the speech information the basis of the video information and the speech information; the joint information generating module to acquire multiple pieces of word-joint information corresponding to the speech language sentence from a joint information database and sequentially receive the word-joint information to a deep learning network to generate sentence-joint information; and a video generation module to generate a motion model on the basis of the sentence-joint information and synthesize the background image and the appearance image on the motion model.

The features and advantages of the present invention will become more apparent from the following detailed description based on the accompanying drawings.

First, terms and words used in the present specification and claims should not be construed in a typical and dictionary sense, and it should be construed as meaning and concept consistent with the technical idea of the present invention on the principle that the inventor can properly define the concept of a term to describe its invention in the best possible way n.

According to an embodiment of the present invention, by translating a speech language into a sign language in real time, and displaying a sign language video in which the appearance of a speech language user, which is a conversation partner, is reflected in a terminal worn by a sign language user in a augmented realistic manner, a natural conversation environment can be provided in which the sign language user and the speech language user may communicate with each other while looking at each other can be provided to help talk to each other.

According to an embodiment of the present invention, since the sign language video is generated using the joint information indicating the movements of the body joints in coordinates, whereby it is possible to use the storage space efficiently compared to the method of storing the sign language video for each of sign language words or sentences.

According to an embodiment of the present invention, by combining a non-linguistic expression of a speech language user in a process of generating sentence-joint information using word-joint information corresponding to a sign language word, it is possible to provide a natural sign language sentence reflecting non-linguistic meaning expressed by the speech language user.

According to an embodiment of the present invention, even when a part of the body of the conversation partner is not photographed by the camera, it is possible to reflect the part of the body not photographed by the camera on the sign language video by using all or a part of the conversation partner's appearance image or the basic appearance image previously stored.

DETAILED DESCRIPTION

Figure 1:
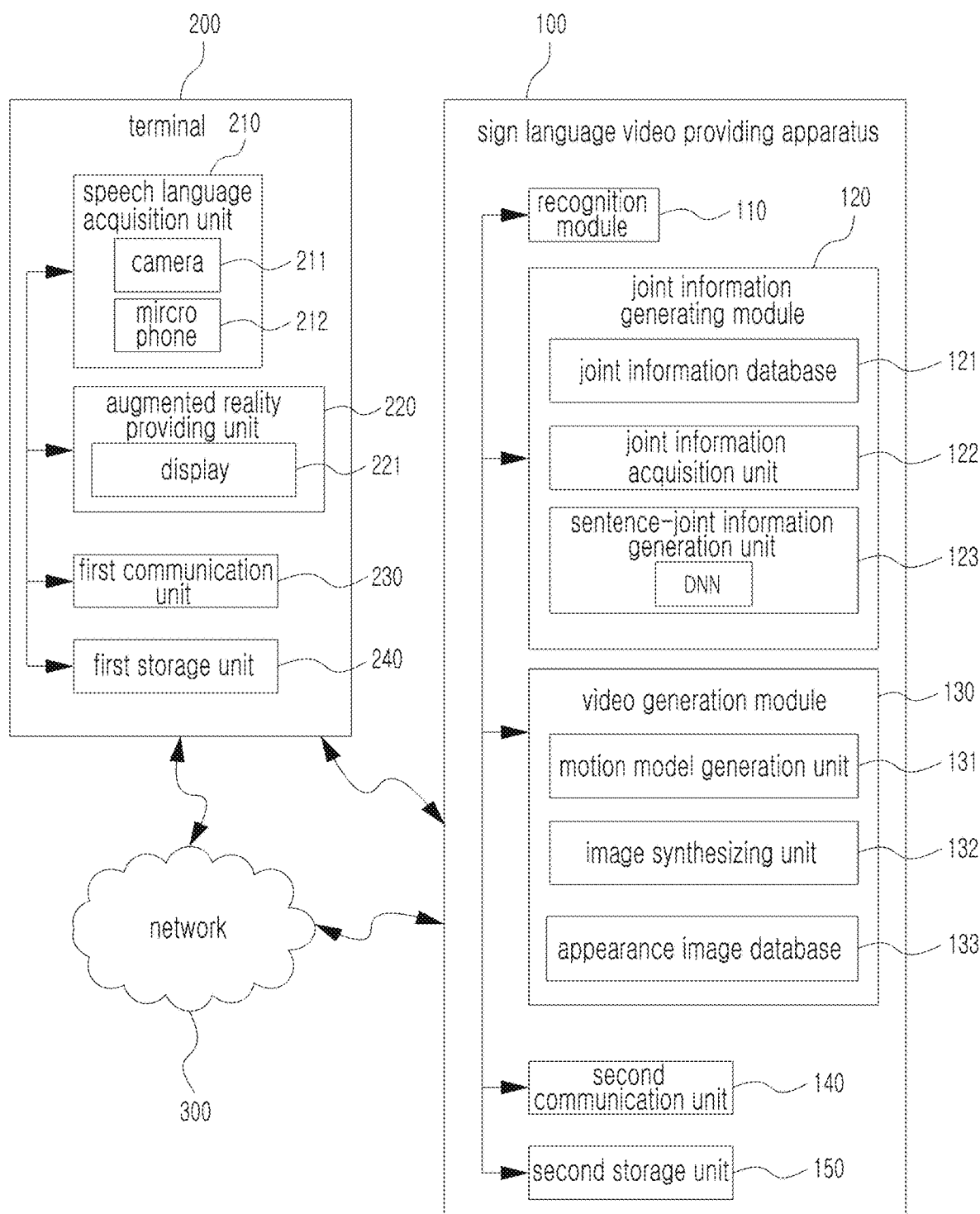
FIG. 1 is a diagram illustrating a sign language video providing apparatus and a sign language video providing terminal reflecting an appearance of a conversation partner according to an embodiment of the present invention.

The objects, particular advantages, and novel features of embodiments of the invention will become more apparent from the following detailed description taken in conjunction with the accompanying drawings. It should be noted that, in the present specification, the reference numerals are added to the constituent elements of the drawings, and the same constituent elements have the same numerical numbers as much as possible even if they are displayed on different drawings. Also, the terms "one side", "the other side", "first", "second", and the like are used to distinguish one element from another, and the elements are not limited by the terms. The terms such as "first", "second", and the like can be replaced by adding "-1", "-2", and the like to the elements. In the following description of the present invention, a detailed description of known arts which may unnecessarily obscure the gist of an embodiment of the present invention will be omitted.

Hereinafter, an embodiment of the present invention will be described in detail with reference to the accompanying drawings.

In describing an embodiment of the present invention, a sign language refers to a method of visually delivering an opinion through a gesture, and a speech language refers to a method of audibly delivering an opinion using a sound and may be called a natural language or a sound language. A sentence such as text generated by converting a speech language into a character such as an alphabet may also be included in the speech language. An apparatus 100 for providing a sign language video reflecting an appearance of a conversation partner according to an embodiment of the present invention can be simply referred to as a sign language video providing apparatus 100, and a terminal 200 for providing a sign language video reflecting an appearance of a conversation partner according to an embodiment of the present invention can be simply referred to as a terminal 200.

FIG. 1 is a diagram illustrating a sign language video providing apparatus 100 and a sign language video providing terminal 200 reflecting an appearance of a conversation partner according to an embodiment of the present invention.

The terminal 200 is an information processing device that a sign language user may wear. The terminal 200 may include a wearable device such as a smart glass or a head mounted display (HMD), a communication device such as a smartphone, a PC, a notebook PC, a tablet, and the like. The sign language user may wear the terminal 200 and communicate with the conversation partner while looking at him/her. The terminal 200 receives the speech language spoken by the conversation partner, photographs the conversation partner, and provides the same to the sign language video providing apparatus 100 in real time. Also, terminal 200 displays the sign language video received in real time from the sign language video providing apparatus 100 on a display 221 to provide the same to the sign language user. The terminal 200 and the sign language video providing apparatus 100 may send and receive data via the network 300 or in real time directly between the terminal 200 and the sign language video providing apparatus 100. The sign language video providing apparatus 100 converts a speech language spoken by the conversation partner into sign language using the data received from the terminal 200 to provide the same to the terminal 200 in real time.

As shown in FIG. 1, a sign language video providing terminal 200 reflecting an appearance of a conversation partner according to an embodiment of the present invention includes a speech language acquisition unit 210 for photographing a conversation partner that speaks a speech language to generate video information, receiving the speech language to generate speech information, and transmitting the video information and the speech information to the sign language video providing apparatus 100 in real time, and an augmented reality providing unit 220 for receiving, in real time, a sign language video reflecting an appearance of a conversation partner and generated on the basis of the video information and speech information provided from the sign language video providing apparatus 100 and visually displaying the sign language video to the sign language user using an augmented reality method.

The terminal 200 may further include a first communication unit 230. The first communication unit 230 may transmit/receive data, in real time, with a second communication unit 140 of the sign language video providing apparatus 100 directly or through the network 300. The terminal 200 may further include a first storage unit 240. The first storage unit 240 may store program code, the sign language video, the speech information, the video information, and the like, which are necessary for operating the terminal 200.

The speech language acquisition unit 210 may include a camera 211 and a microphone 212. The camera 211 generates 2D RGB type video information. The camera 211 is located in the terminal 200 so as to photograph the sign language user in his/her viewing direction. The microphone 212 may receive a speech language spoken by a conversation partner who talks with a sign language user. The microphone 212 may utilize an omnidirectional or directional microphone. The augmented reality providing unit 220 may include a display 221. The display 221 may use various types of displays such as an LCD, an OLED, a hologram, and a transparent display. The display 221 is located in the viewing direction of the sign language user. The speech language acquisition unit 210 and the augmented reality providing unit 220 may be implemented in such a manner that program codes capable of performing the functions are executed in a processor.

The sign language video providing apparatus 100 reflecting the appearance of the conversation partner according to an embodiment of the present invention includes a recognition module 110 for recognizing an appearance image ApI and an background image BcI from the video information on the basis of on the video information and the speech information and recognizing a speech language sentence from the speech information; a joint information generating module 120 for acquiring a plurality of word-joint information WJinfo corresponding to a speech language sentence from the joint information database 121 and sequentially inputting the word-joint information WJinfo to a deep learning neural network DNN to generate a sentence-joint information SJinfo; and an video generation module 130 for generating a motion model Mm on the basis of the sentence-joint information SJinfo and generating a sign language video in which the background image BcI and then appearance image ApI are synthesized with the motion model Mm. The recognition module 110, the joint information generating module 120, and the video generation module 130 may be implemented in such a manner that the program code capable of performing the above functions is executed in a processor. The sign language video providing apparatus 100 may be a computer device such as a server or a PC.

The recognition module 110 further recognizes speech-based non-linguistic information NLinfoS from the speech information as well as appearance image ApI, background image BcI, and speech language sentence and further recognizes video-based non-linguistic information NLinfoV from the video information. The video information and the speech information are data provided by terminal 200 worn by the sign language user in real time and generated by causing the terminal 200 to photograph the conversation partner and record his/her voice.

The joint information generating module 120 includes a joint information database 121 that stores word-joint information WJinfo for reproducing a gesture representing a sign language word, at least one sign language word having the same meaning as a speech language sentence; a joint information acquisition unit 122 that acquires, from the joint information database 121, one or more word-joint information WJinfo corresponding to one or more sign language word having the same meaning as the speech language sentence on the basis of sign language grammar; and a sentence-joint information generation unit 123 that receives one or more pieces of word joint information WJinfo acquired from the joint information acquiring unit to generate sentence-joint information SJinfo, by using a deep learning neural network (DNN) learned with learning data of which input data includes the word-joint information WUinfo and correct data is the sentence-joint information SJinfo.

In addition, the sentence-joint information generation unit 123 receives one or more pieces of word-joint information WJinfo acquired by the joint information acquiring unit, the speech-based non-linguistic information NLinfoS, and the video-based non-linguistic information NLinfoV to generate the sentence-joint information SJinfo, by using a deep learning neural network (DNN) learned with learning data of which input data further includes speech-based non-linguistic information NLinfoS and video-based non-linguistic information NLinfoV, and correct data is the sentence-joint information SJinfo.

The video generation module 130 includes a motion model generation unit 131 that generates a motion model Mm of a human shape moving according to sentence-joint information SJinfo, and an image synthesizing unit 132 that synthesizes the background image BcI and the appearance image ApI with the motion model Mm to generate a sign language video. The video generation module 130 further includes appearance image database 133 for storing an appearance image ApI of a conversation partner who is being currently in conversation or was previously in conversation, and a basic appearance image obtained from a general person's appearance or generated via a graphic. The video generation module 130 may provide the sign language video to the terminal 200 worn by the sign language user so that the sign language video is reproduced in real time on the terminal 200 worn by the sign language user.

The sign language video providing apparatus 100 may further include a second communication unit 140. The second communication unit 140 may transmit and receive data in real time with the first communication unit 230 of the terminal 200 or through the network 300. The sign language video providing apparatus 100 may further include a second storage unit 150, and the second storage unit 150 may store program codes for operating the sign language video providing apparatus 100.

Figure 2:
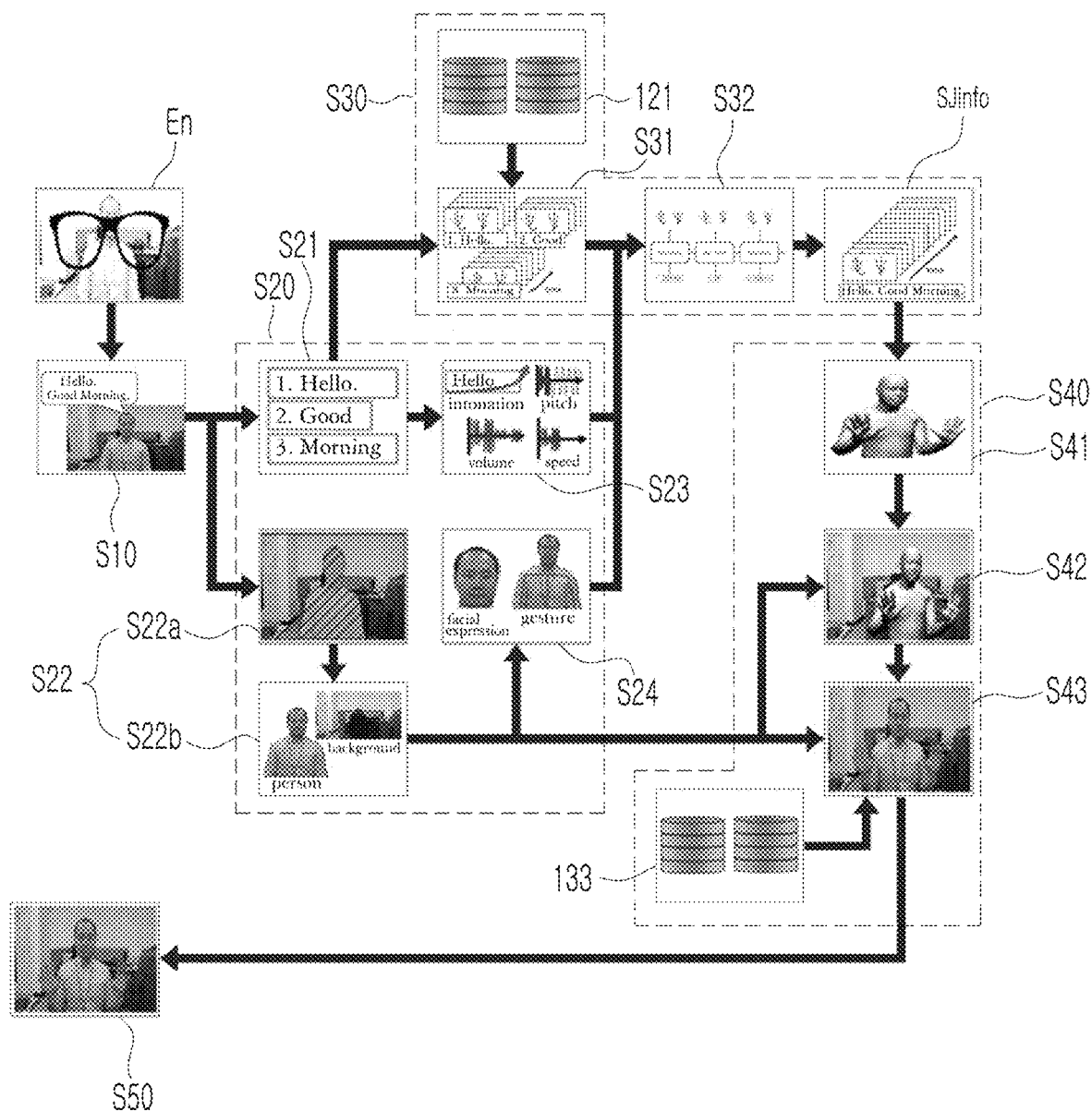
FIG. 2 is a diagram illustrating each step of a method of providing a sign language video reflecting an appearance of a conversation partner according to an embodiment of the present invention.

FIG. 2 is a diagram illustrating each step of a method of providing a sign language video reflecting an appearance of a conversation partner according to an embodiment of the present invention.

A method of providing a sign language video reflecting the appearance of a conversation partner according to an embodiment of the present invention includes a recognition step S20 of recognizing a speech language sentence from speech information, and recognizing an appearance image ApI and a background image BcI from video information; a sign language joint information generation step S30 of acquiring multiple pieces of word-joint information WJinfo corresponding to the speech language sentence from joint information database 121 and sequentially inputting the word-joint information WJinfo to a deep learning neural network (DNN) to generate sentence-joint information SJinfo; and a video generation step S40 of generating a motion model Mm on the basis of the sentence-joint information SJinfo, and generating a sign language video in which the background image BcI and the appearance image ApI are synthesized with the motion model Mm. The recognition step S20 further includes recognizing the speech-based non-linguistic information NLinfoS from the speech information and recognizes the video-based non-linguistic information NLinfoV from the video information.

A method of providing a sign language video reflecting the appearance of a conversation partner according to an embodiment of the present invention further includes: before the recognition step S20, a speech language acquisition step of receiving, in real time, the video information generated by photographing the conversation partner who speaks a speech language by a terminal 200 worn by the sign language user and the speech information generated by receiving the speech language delivered by sound, from the terminal 200; and after the video generation step S40, an augmented reality providing step S50 of transmitting the sign language video to the terminal 200 worn by the sign language user in real time to provide the same to the sign language user in an augmented reality method so that the sign language video generated in the video generation step S40 is visually displayed to the sign language user.

Figure 3:
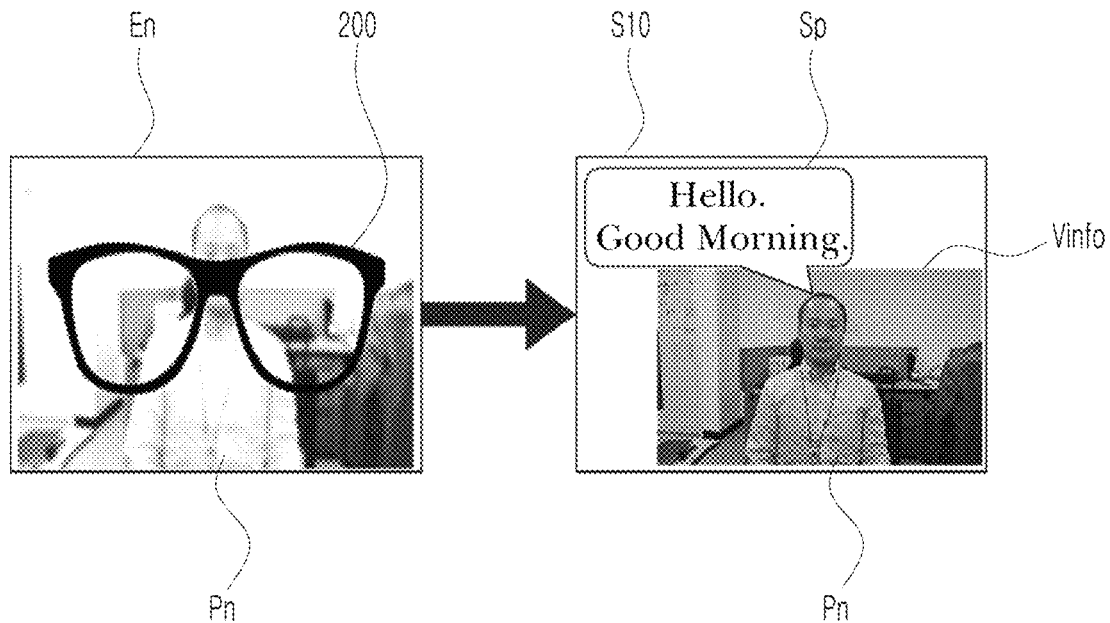
FIG. 3 is a diagram illustrating a speech language acquisition step according to an embodiment of the present invention.

FIG. 3 is a diagram illustrating a speech language acquisition step S10 according to an embodiment of the present invention.

As shown in FIGS. 2 and 3, the terminal 200 performs the speech language acquisition step S10 in an environment in which a sign language user talks with a speech language user. In the speech language acquisition step S10, the speech language acquisition unit 210 of the terminal 200 photographs the speech language user, which is a conversation partner Pn of the sign language user, through the camera 211 to generate video information. In the speech language acquisition step S10, the speech language acquisition unit 210 of the terminal 200 receives the speech language Sp spoken by the speech language user, which is the conversation partner Pn of the sign language user, through the microphone 212, to generate the speech information.

The speech language acquisition unit 210 of the terminal 200 transmits, in real time, video information and speech information to the sign language video providing apparatus 100 through the first communication unit 230. The video information includes a conversation partner Pn and the background in a single image. The speech information may include data obtained by receiving the speech language Sp that the conversation partner speaks and converting the same into an electrical signal. In the speech language acquisition step S10, the sign language video providing apparatus 100 receives the video information and the speech information transmitted by the terminal 200 through the second communication unit 140. The speech language acquisition unit 210 of the terminal 200 may process information that is output from the camera 211 and the microphone 212 using a processor capable of processing voice or image data.

Figure 4:
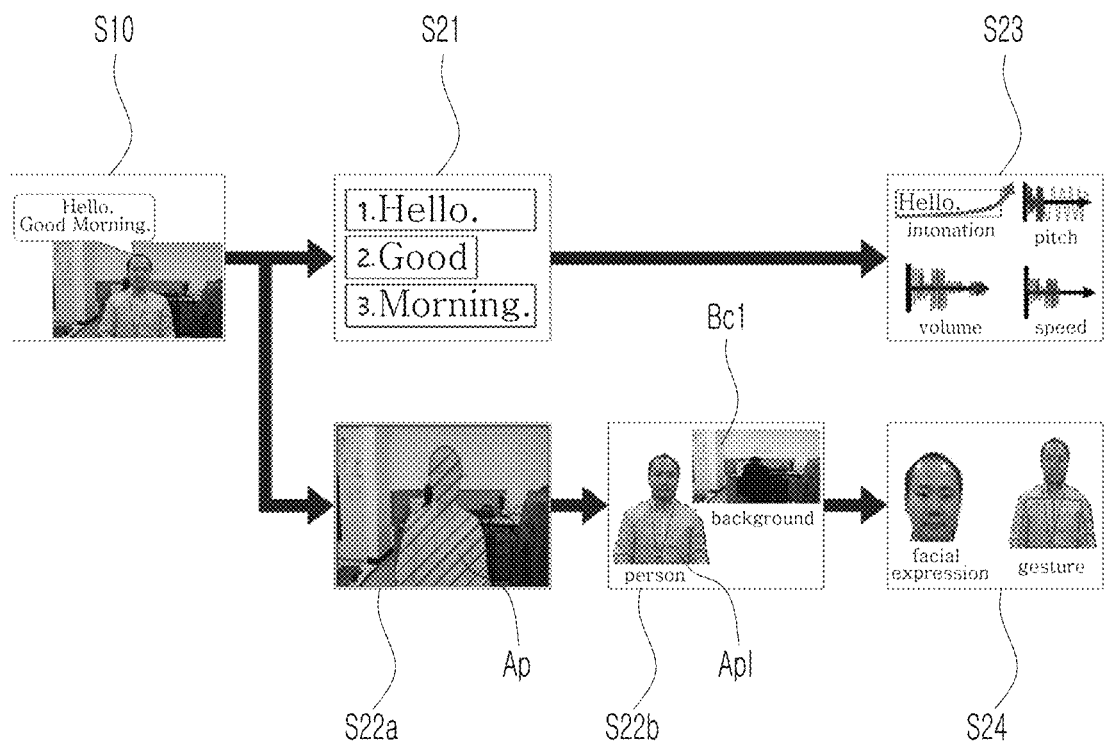
FIG. 4 is a diagram illustrating a recognition step according to an embodiment of the present invention.

FIG. 4 is a diagram illustrating a recognition step S20 according to an embodiment of the present invention.

As shown in FIGS. 2 and 4, the speech language acquisition step S10 is performed so that the image providing apparatus 100 acquires video information and speech information, and then the recognition step S20 is performed in the recognition module 110 of the sign language video providing apparatus 100. The recognition step S20 includes a semantic recognition step S21 of recognizing a speech language sentence from the speech information, and an image separation step S22 for separating the appearance image ApI and the background image BcI from the video information.

The semantic recognition step S21 is a process of recognizing the linguistic meaning of the speech language from the speech information storing the sound. In the semantic recognition step S21, the recognition module 110 may use various types of speech to text (STT) algorithms. For example, as shown in FIG. 4, in the recognition step S21, the recognition module 110 recognizes a speech language sentence of "Hello. Good morning" from the speech information.

The image separation step S22 includes a person area extraction step S22a of recognizing an area (hatched area in FIG. 4) in which an appearance Ap of a conversation partner appears in an arbitrary frame of video information, and a separation step S22b of separating the appearance image ApI corresponding to the appearance Ap of the conversation partner from the background image BcI in which objects other than the conversation partner are photographed. The image separation step S22 is a process of acquiring the appearance of the conversation partner by distinguishing the appearance Ap of the conversation partner from the other objects in the video information. The algorithm used for distinguishing the appearance Ap of the conversation partner may use a known method.

In the person area extraction step S22a, the recognition module 110 extracts the person area (the hatched area in FIG. 4) using a known method. In the separation step S22b, the recognition module 110 may separate the appearance image ApI included in the person area (the hatched area in FIG. 4) from the other background image BcI. For example, as shown in FIG. 4, in the person area extraction step S22a, the recognition module 110 extracts a person area indicated by a hatched portion in an arbitrary frame of video information, and in a separation step S22b, the appearance image ApI may be separated from the background image BcI on the basis of the outline of the person area (the hatched area in FIG. 4).

As shown in FIGS. 2 and 4, the recognition step S20 further includes a speech non-linguistic information recognition step S23 of recognizing speech-based non-linguistic information NLinfoS from the speech information; and a video non-linguistic recognition step S24 of recognizing video-based non-linguistic information NLinfoV from the video information. The non-linguistic information includes elements other than speech language sentences, which are used to supplement the linguistic meaning conveyed in the communication process or to deliver the speaker's feelings or intentions. For example, the non-linguistic information includes a facial expression indication emotion, a gesture having a specific meaning, and an intonation, a pitch, a speed, and the like of the speech language.

The speech-based non-linguistic information NLinfoS may include information quantified by recognizing at least one of an intonation, a pitch, a volume, and a speed of the voice language, and the video-based non-linguistic information NLinfoV may include information quantified by recognizing at least one of the type of emotion, the balance between positive and negative, and the excitement on the basis of facial expressions or gestures appearing in the appearance image ApI of the video information. The non-linguistic information that may be recognized by the recognition module 110 is not limited to description herein.

In the voice non-linguistic information recognition step S23, the recognition module 110 may recognize non-linguistic information such as an intonation, a pitch, a volume, and the like, on the basis of the sampling rate of the speech information. For example, when the sampling rate of speech information is 40 kHz, there are 40,000 data per second, and the intonation, the pitch, and the volume may be quantified on the basis of the data. The intonation, the pitch, the volume, and the like may be quantified as values that vary with time. The speed which is non-linguistic information is calculated in consideration of the length of the speech language sentence recognized in the semantic recognition step S21 and the speech length (time). For example, in the case that a speech language sentence is "Hello. Good morning", when the length of the sentence contains 12 syllables, and the speech length (time) is 5 seconds, the speed may be calculated to 2.4 characters per second.

As shown in FIG. 4, in the video non-linguistic information recognition step S24, the recognition module 110 recognizes at least one of the facial expression and the gesture from the appearance image Apt and recognize the emotion, the balance between positive and negative, and excitement using the same. The facial expression can be extracted every frame, and the recognition module 110 can recognize the emotion based on the facial expression. The gesture can be recognized by assigning feature points to the appearance image (ApI) and using the positional relationship based on the coordinate values of the feature points. The feature point can be set in the main parts of a person such as a shoulder, an elbow or a hand, and a known method can be used as a method of recognizing a feature point in an appearance image ApI. Video-based non-linguistic information NLinfoV, which is capable of being obtained using facial expressions or gestures, may include types of emotions such as anger, contempt, fear, happiness, neutrality, sadness, fright, and the like, and the degree of excitement quantifying the intensity of the emotions.

Figure 5:
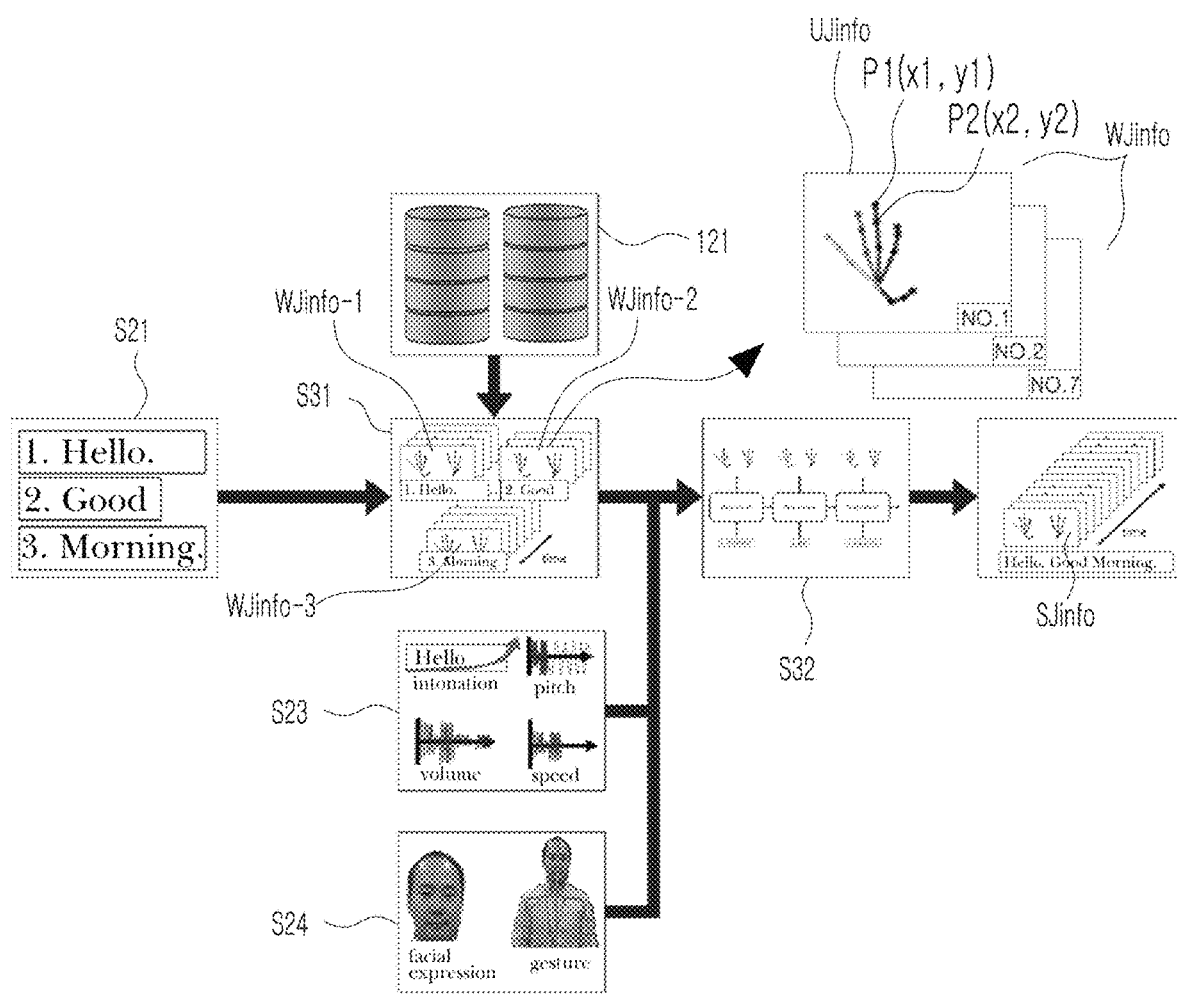
FIG. 5 is a view illustrating a sign language joint information generation step according to an embodiment of the present invention.

FIG. 5 is a view illustrating a sign language joint information generation step S30 according to an embodiment of the present invention.

As shown in FIGS. 2 and 5, sign language joint information generation step S30 may include a joint information acquisition step S31 of acquiring one or more word-joint information WJinfo corresponding to one or more sign language words having the same meaning as a speech language sentence from the joint information from the joint information database 121 on the basis of sign language grammar; and a sentence joint information generation step S32 of receiving the acquired one or more pieces of word-joint information WJinfo acquired by the joint information acquisition unit to generate sentence-joint information SJinfo, by using a deep learning neural network (DNN) learned with learning data of which input data includes word-joint information WJinfo and correct data is sentence-joint information.

In the sign language joint information generation step S30, the joint information acquisition unit 122 of the joint information generating module 120 performs a joint information acquisition step S31, and a sentence-joint information generation unit 120 of the joint information generating module 120 performs the sentence-joint information generation step S32. In the joint information acquisition step S31, the joint information acquisition unit 122 acquires, according to an order, at least one piece of word-joint information WJinfo stored in the joint information database 121 so as to have the same meaning as the speech language sentence, based on the speech language sentence recognized in the semantic recognition step S21. The process of acquiring the word-joint information WJinfo on the basis of the recognized speech language sentence may be performed through the search of the joint information database 121.

For example, as shown in FIG. 5, when the speech language sentence is "Hello, good morning.", the joint information acquisition unit 122 acquires word-joint information WJinfo-1 corresponding to a sign language word having the same meaning as "Hello", word-joint information WJinfo-2 corresponding to a sign language word having the same meaning as "Good", and word-joint information WJinfo-3 corresponding to the sign language word having the same meaning as "morning" among multiple pieces of word-joint information WJinfo stored in the joint information database 121. The process of acquiring the word-joint information WJinfo on the basis of the speech language sentence is not limited to the description of the present specification, and a step of translating the speech language sentence into a list of sign language words, and a step of acquiring word-joint information WJinfo corresponding to a sign language word may be performed.

The joint information database 121 may store word-joint information WJinfo. The word-joint information and the sentence-joint information may include, according to an order, one or more pieces of unit-joint information including coordinates of a plurality of feature points of the body necessary for reproducing gestures. The unit-joint information UJinfo may contain the coordinates of a plurality of feature points of the body necessary to reproduce the gesture at any point in time. The sign language word may be gestures that generally include movements of the upper body including hands, arms, shoulders, and face, and the word-joint information WJinfo includes multiple pieces of unit-joint information UJinfo in a manner as to be listed in order, in which the coordinates of the feature points of the body that are necessary to reproduce the gestures move over time.

For example, as shown in FIG. 5, when the sign language word is a gesture composed of hand movements, the word-joint information WJinfo includes multiple pieces of unit-joint information UJinfo including coordinates of feature points of hand joints at any point of time, and multiple pieces of unit-joint information UJinfo may include information on the movement of feature points that are arranged according to an order to reproduce the gestures. For example, the unit-joint information No. 1 at any point of time in the gesture includes a coordinate P1(x1, y1) of the feature point at the end of an index finger, and the unit-joint information No. 2 at the next point of time in the gesture may include a coordinate P1(x1', y1') in which the feature point of the end of the index finger has moved. The word-joint information WJinfo may include information that the end P1 of the index finger moves from (x1, y1) to (x1', y1') with time. When the human body model is moved according to the word-joint information WJinfo, it is possible to acquire motion corresponding to the sign language word.

In the sentence-joint information generation step S32, the sentence-joint information generation unit 123 receives, according to an order, at least one piece of word joint information WJinfo obtained in such a manner as to have the same meaning as the speech language sentence using the deep learning neural network (DNN) to generate sentence-joint information SJinfo capable of reproducing one or more gestures continuously and naturally. The sentence-joint information SJinfo may include, according to an order, at least one piece of unit joint information UJinfo that includes coordinates of multiple feature points of the human body, which are necessary to reproduce the gesture.

In the sentence-joint information generation step S32, the coordinate of the feature point may be moved in the process of causing one or more pieces of word-joint information WJinfo to be naturally connected to each other. For example, the last unit-joint information UJinfo of the word-joint information WJinfo corresponding to "Hello" and the first unit-joint information UJinfo of the word-joint information WJinfo corresponding to "good" have a large difference from each other in the position of the feature point, the coordinates of the feature point may be moved in such a manner that the difference in positions of the feature points becomes small by performing the sentence-joint information generation step S32. Therefore, in contrast to the method of simply arranging sign language word videos in the related art, it is possible to generate a sign language sentence in which sign language words are naturally connected according to an embodiment of the present invention.

Figure 6:
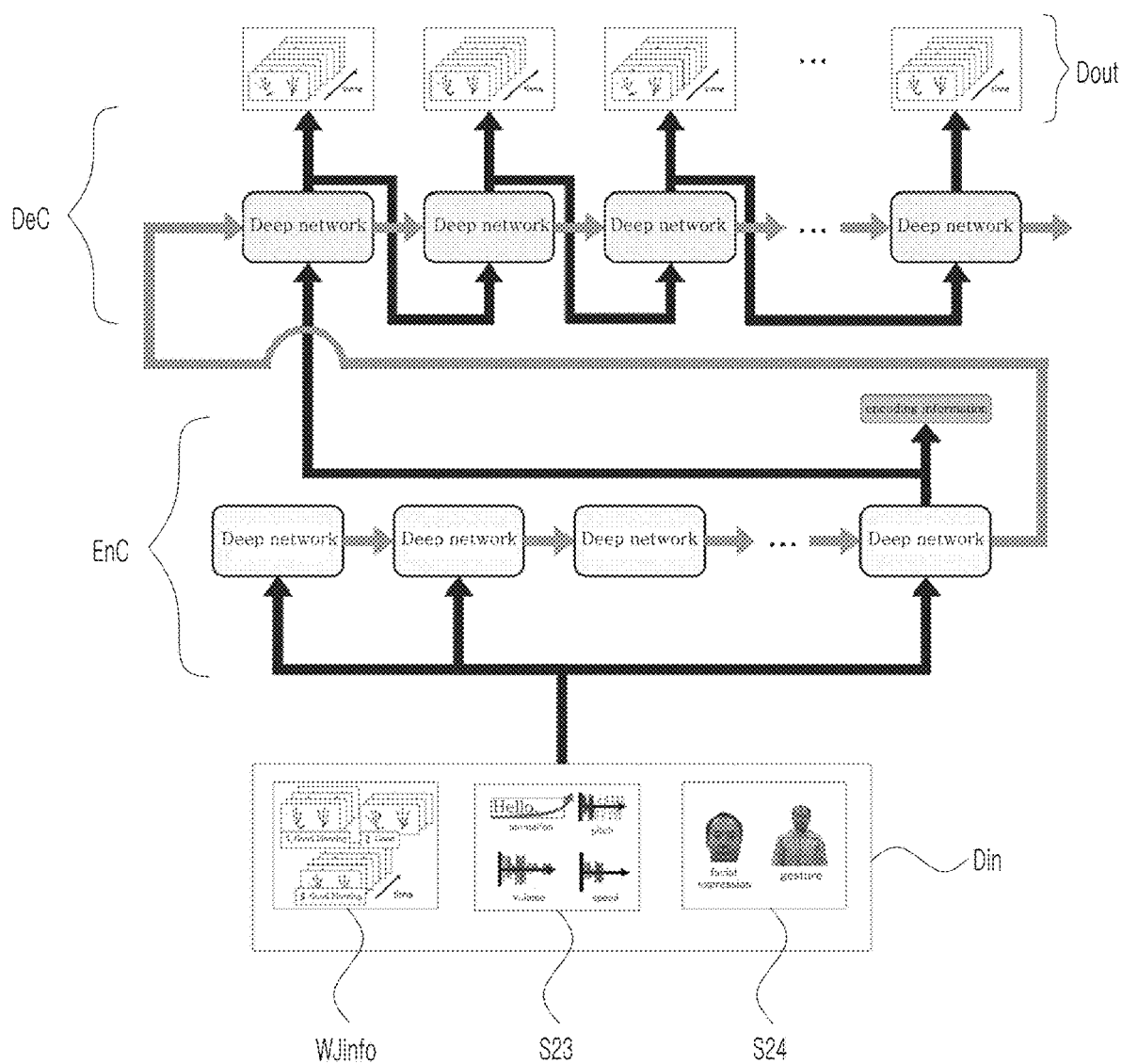
FIG. 6 is a diagram illustrating a deep learning neural network of a sentence-joint information generation step according to an embodiment of the present invention.

FIG. 6 is a diagram illustrating a deep learning neural network (DNN) of a sentence-joint information generation step S32 according to an embodiment of the present invention.

As shown in FIG. 6, the deep learning neural network (DNN) of the sign language-joint information generation unit may include an encoder unit EnC and a decoder unit DeC of a circular neural network structure. The encoder unit EnC provides the result obtained by encoding the input data together as an input when encoding the next input data. The encoder unit EnC performs encoding on up to data input finally to generate resulting encoding information. The encoding information is provided as an input of the decoder, and the result obtained by encoding the last data is provided as an input of the decoder unit DeC. The decoder unit DeC successively outputs the unit-joint information UJinfo constituting the sentence-joint information SJinfo, with the result obtained by encoding the last data received from the encoding unit and encoding information as inputs. The decoder unit DeC provides the decoded result as an input of the next decoding.

The deep learning neural network (DNN) may be learned with learning data composed of pairs of input data and correct data. In the deep learning neural network (DNN), the input data may include word-joint information WJinfo, and the correct data may include sentence-joint information SJinfo. The input data is such that multiple pieces of word-joint information WJinfo are listed to have an order, and the correct data may be sentence-joint information SJinfo in which multiple pieces of word-joint information WJinfo are naturally connected. The learned deep learning neural network (DNN) receives multiple pieces of word-joint information WJinfo as an input Din and has natural sentence-joint information SJinfo as an output Dout on the basis of the learned.

The input data of the deep learning neural network (DNN) may further include not only word-joint information WJinfo but also speech-based non-linguistic information NLinfoS recognized in the voice non-linguistic information recognition step and video-based non-linguistic information NLinfoV recognized in the video non-linguistic information recognition step. In this case, the sentence-joint information generation step S32 may receive one or more word-joint information WJinfo acquired in the joint-information acquisition unit, speech-based non-linguistic information NLinfoS, video-based non-linguistic information NLinfoV as an input Din and have sentence-joint information SJinfo as an output Dout, by using a deep learning neural network (DNN) learned with learning data of which input data further includes speech-based non-linguistic information NLinfoS and video-based non-linguistic information NLinfoV and correct data is sentence-joint information SJinfo reflecting the speech-based non-linguistic information or the video-based non-linguistic information NLinfoV. When the input Din includes the speech-based non-linguistic information NLinfoS and the video-based non-linguistic information NLinfoV, the deep learning network (DNN) may have sentence-joint information SJinfor in which the size, speed, and the like of movements in gestures are controlled and the facial expression is included by reflecting the speech-based non-linguistic information NLinfoS and the video-based non-linguistic information NLinfoV.

Figure 7:
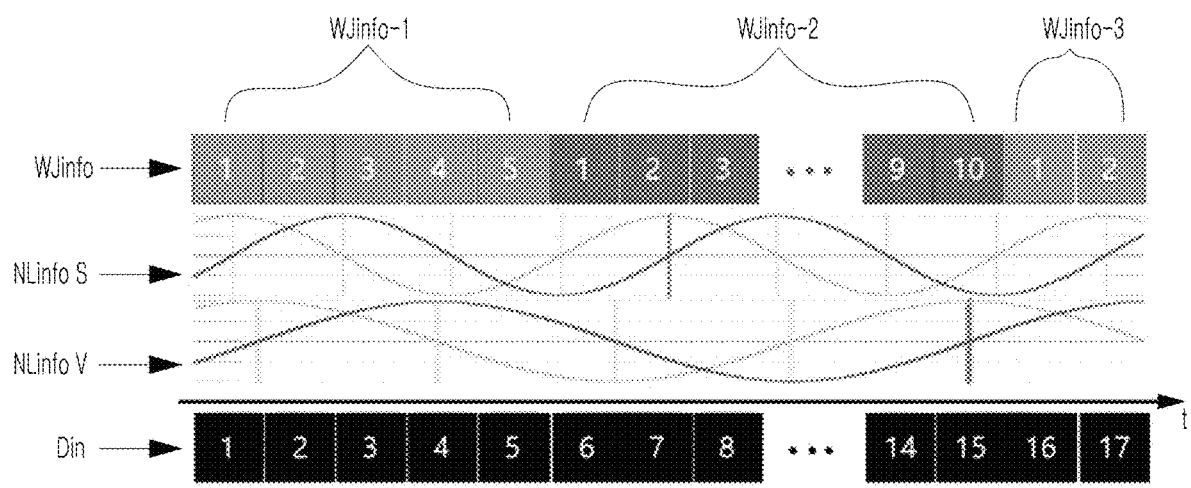
FIG. 7 is a diagram illustrating input data according to an embodiment of the present invention.

FIG. 7 is a diagram illustrating input data according to an embodiment of the present invention. The input Din to the deep learning neural network (DNN) is also the same as the input data. In FIG. 7, multiple pieces of unit-joint information UJinfo of the word-joint information WJinfo are listed according to an order, the speech-based non-linguistic information NLinfoS and the video-based non-linguistic information NLinfoV are exemplified, and the input data incorporating the word-joint information WJinfo, the speech-based non-linguistic information NLinfoS, and the video-based non-linguistic information NLinfoV is also shown.

As shown in FIG. 7, the input data including the word-joint information WJinfo, the speech-based non-linguistic information NLinfoS, and the video-based non-linguistic information NLinfoV may be data integrating each piece of information on the basis of the time. For example, in the case that the speech language sentence is "Hello. Good morning.", the word-joint information WJinfo that constitutes "Hello", "Good", and "morning" is configured with a list of five, ten, and two pieces of unit-joint information UJinfo, respectively. In addition, the speech-based non-linguistic information NLinfoS such as an intonation, a pitch, a volume, and a speed of the "Hello, Good Morning" has numerical values according to the order of time, it can be shown as a graph of FIG. 7, and when the video-based non-linguistic information NLinfoV such as the degree of excitement indicating the intensity of emotion, etc., has numerical values according to the order of time, it may be shown as a graph of FIG. 7.

Here, the input data Din3 at an arbitrary point of time is data obtained by integrating the third unit-joint information UJinfo of word-joint information WJinfo of "Hello" at the same point of time with speech-based non-linguistic information NLinfoS and video-based non-linguistic information NLinfoV at the same point of time. The total length of the input data Din may be 17, which is the same as the sum of the unit-joint information UJinfo of the word-joint information WJinfo. Such integrated input data is data having an order of time, and provided to the deep learning neural network (DNN) as input Din and used to generate the encoding information. The deep learning neural network (DNN) outputs unit-joint information UJinfo, which constitutes sentence-joint information SJinfo representing the entire sign language sentence.

Figure 8:
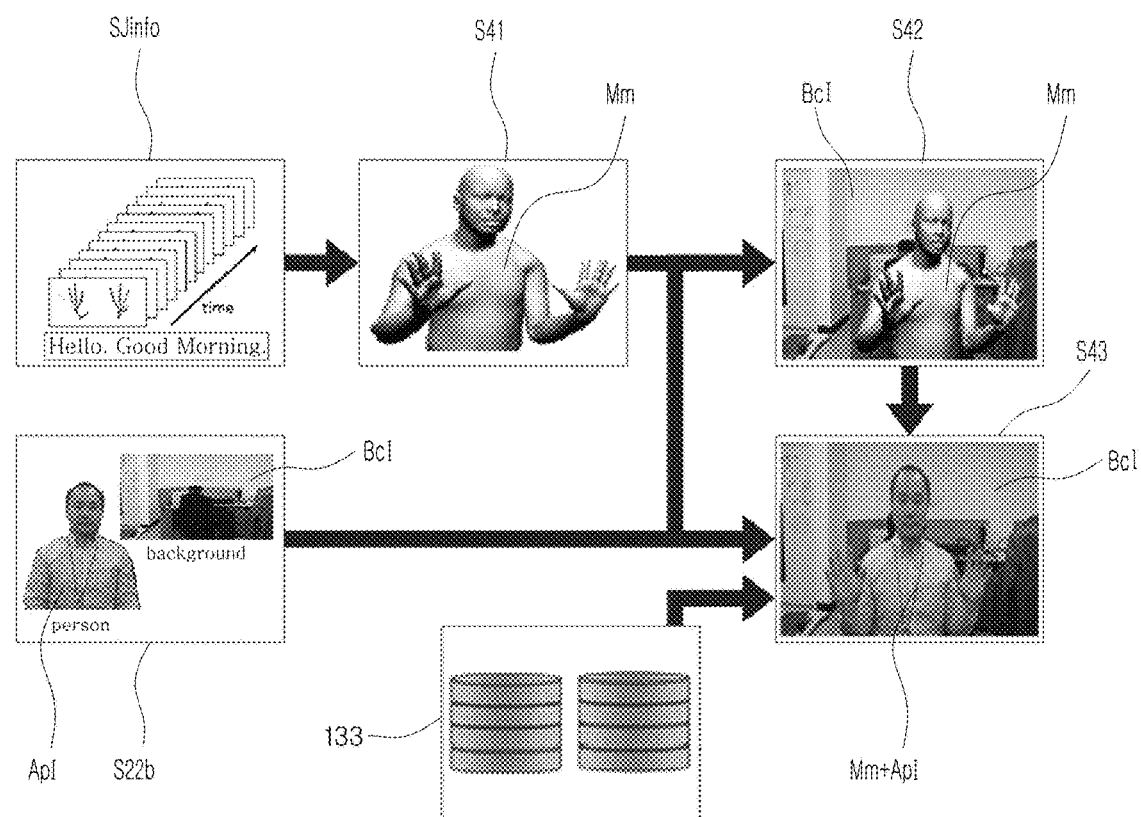
FIG. 8 is a diagram illustrating a video generation step according to an embodiment of the present invention.

FIG. 8 is a diagram illustrating a video generation step S40 according to an embodiment of the present invention.

As shown in FIG. 8, the video generation step S40 includes a motion model generation step S41 of generating a motion model moving according to sentence joint information, a background image synthesis step S42 of synthesizing a background image on the background of the motion model, and an appearance image synthesizing step S43 of synthesizing an appearance image on the motion model. In the video generation step S40, the video generation module 130 generates a motion model Mm that reproduces the gesture according to the sentence-joint information SJinfo generated by the sentence-joint information generation unit 123, synthesizes the background image BcI on the motion model Mm and synthesizes the appearance image ApI on the motion model Mm to generate a sign language video as if the actual conversation partner realizes the sign language sentence. In addition, when a part of the body of the conversation partner is not included in a person image, the video generation module 130 synthesizes all or a part of the general conversation partner's person image or the basic portrait image previously stored on the motion model to generate the sign language video.

In the motion model generation step S41, the motion model generation unit 131 of the video generation module 130 may generate a motion model Mm that moves according to sentence-joint information SJinfo. The motion model Mm generated in the motion model generation step S41 may be a 3D type human graphic model. The motion model Mm may reproduce the gesture by moving the hands, arms, shoulder, face, and the like of the motion model Mm according to the movements of the feature points included in the sign language sentence joint model. The motion model Mm may contain the body components necessary to deliver the sign language. For example, the motion model Mm may include the body components required to reproduce gestures, such as eyes, nose, mouth, ears, eyebrows, fingers, and the like.

The image synthesis unit 132 of the video generation module 130 in the background image synthesis step S42 synthesizes the background image BcI acquired in the image separation step S22 on the background of the motion model Mm. When the background image synthesis step S42 is performed, the motion model Mm reproduces the sign language gesture on the background image Bd. Next, in the appearance image synthesis step S43, the image synthesis unit 132 of the video generation module 130 synthesizes an appearance image ApI on the motion model Mm. When the appearance image synthesis step S43 is performed, the motion model Mm reproduces the sign language gesture in a state in which the appearance image ApI is synthesized. Thus, the appearance of the conversation partner of the sign language user is reflected on the motion model (Mm), whereby a sign language video is generated as if the conversation partner reproduces the sign language gesture.

There is a case in which a part of the body required to generate a sign language video does not appear in the appearance image. For example, as shown in FIG. 8, the face and the upper body are included but the hand may not be included, in the appearance image ApI. When generating the sign language video, an appearance image ApI corresponding to the hand of the conversation partner is almost always required. However, in a real conversation environment, the hand may not be photographed by the camera, and in such a case, a method of acquiring the image of the hand is necessary.

The appearance image synthesis step S43 according to an embodiment of the present invention includes synthesizing all or a part of the conversation partner's appearance image or the basic appearance image previously stored on the motion model, when a part of the body of the conversation partner is not included in the appearance image ApI. The appearance image database 133 may store appearance images ApI relating to various conversation partners, and may store an image for a specific part of the body separately. The video generation module 130 includes appearance image database 133 and may use the appearance image ApI stored in the appearance image database 133 in the appearance image synthesis step S43.

For example, the appearance image database 133 may store an appearance image ApI of a conversation partner that frequently talks with a sign language user. The image synthesis unit 132 searches the appearance image database 133 for an appearance image ApI similar to the appearance image ApI of the conversation partner that is currently during conversation to find the appearance image ApI of a specific conversation partner, and then synthesize all or a part of the stored appearance image ApI of the specific conversation partner on the motion model.

In addition, the appearance image database 133 may store a default appearance image ApI representing the person's general appearance. The default appearance image ApI may be used for any conversation partner. The image synthesis unit 132 may synthesize all or a part of the default appearance image ApI on the motion model when the appearance image ApI of the conversation partner who is currently during conversation is not present in the appearance image database 133. Through such process, it is possible to generate a sign language video that is visually delivered through an operation even in an environment where a part of the body such as a hand is not photographed and to generate a visually natural sign language video using the conversation partner's appearance image ApI or the basic appearance image Apt which are previously stored.

Next, the video generation module 130 may display the sign language video to enable the sign language user to visually recognize the same. The sign language video may be delivered to the terminal 200 of the sign language user and displayed to the sign language user. A augmented reality providing step S50 may be performed in which the video generation module 130 provides the sign language video to a terminal 200 worn by the sign language user so that the sign language video is reproduced in real time on the terminal 200 when the terminal 200 of the sign language user is a wearable device such as a smart glass, and the terminal 200 receives, in real time, the sign language video reflecting the appearance of the conversation partner generated on the basis of the video information and the speech information from the sign language video providing apparatus 100 and visually displays the sign language video to the sign language user. Compared to a case in which a sign language video is displayed on a smart phone or a monitor screen, when a sign language video is provided to a sign language user through an augmented reality method through a terminal 200 such as a smart glass, it is possible to provide a natural conversation environment in which the sign language user may talk with a conversation partner while looking at him/her.

The augmented reality providing unit 220 of the terminal 200 may display the sign language video received from the sign language video providing apparatus 100 to the sign language user in the augmented reality providing step S50. Here, the sign language video is an video generated by allowing the recognition module 110 of the sign language video providing apparatus 100 to recognize the appearance image ApI and the background image BcI from the video information and recognize the speech language sentence from the speech information the basis of the video information and the speech information; the joint information generating module 120 to acquire multiple pieces of word-joint information WJinfo corresponding to the speech language sentence from the joint information database 121 and receive the word-joint information WJinfo to the deep learning network DNN according to the order to generate sentence-joint information SJinfo; and the video generation module 130 to generate a motion model Mm on the basis of the sentence-joint information SJinfo and synthesize the background image BcI and the appearance image ApI on the motion model Mm.

According to an embodiment of the present invention, by translating a speech language into a sign language in real time, and displaying a sign language video in which the appearance of a speech language user, which is a conversation partner, is reflected in a terminal 200 worn by a sign language user in a augmented realistic manner, a natural conversation environment can be provided in which the sign language user and the speech language user may communicate with each other while looking at each other can be provided to help talk to each other.

According to an embodiment of the present invention, since the sign language video is generated using the joint information indicating the movements of the body joints in coordinates, whereby it is possible to use the storage space efficiently compared to the method of storing the sign language video for each of sign language words or sentences.

According to an embodiment of the present invention, by combining a non-linguistic expression of a speech language user in a process of generating sentence-joint information using word-joint information corresponding to a sign language word, it is possible to provide a natural sign language sentence reflecting non-linguistic meaning expressed by the speech language user.

According to an embodiment of the present invention, even when a part of the body of the conversation partner is not photographed by the camera, it is possible to reflect the part of the body not photographed by the camera on the sign language video by using all or a part of the conversation partner's appearance image or the basic appearance image previously stored.

While the present invention has been particularly shown and described with reference to exemplary embodiments thereof, it is to be understood that the same is by way of illustration and example only and is not to be construed as limiting the present invention. It is obvious that the modification and the modification are possible.

It will be understood by those skilled in the art that various changes in form and detail may be made therein without departing from the spirit and scope of the invention as defined by the appended claims.

What is claimed is:

1. A method of providing a sign language video reflecting an appearance of a conversation partner, the method comprising:
   a recognition step of recognizing a speech language sentence from speech information, and recognizing an appearance image and a background image from video information;
   a sign language joint information generation step of acquiring multiple pieces of word-joint information corresponding to the speech language sentence from a joint information database and sequentially inputting the word-joint information to a deep learning neural network to generate sentence-joint information; and
   a video generation step of generating a motion model on the basis of the sentence joint information, and generating a sign language video in which the background image and the appearance image are synthesized with the motion model.

2. The method of claim 1, wherein the sign language joint information generating step includes:
   a joint information acquisition step of acquiring one or more pieces of word-joint information corresponding to one or more sign language words having the same meaning as the speech language sentence from the joint information database based on a sign language grammar; and
   receiving one or more pieces of word-joint information acquired in the joint information acquisition step to generate the sentence joint information by using a deep learning neural network learned with learning data of which input data includes word-joint information and correct data is the sentence-joint information.

3. The method of claim 2, wherein the recognition step further includes recognizing speech-based non-linguistic information from the speech information and recognizing video-based non-linguistic information from the video information, and
   wherein the sentence-joint information generation step includes receiving one or more pieces of word-joint information acquired in the joint information acquiring step, the speech-based non-linguistic information, and the video-based non-linguistic information to generate the sentence-joint information, by using a deep learning neural network learned with learning data of which input data further includes the speech-based non-linguistic information and the video-based non-linguistic information, and correct data is the sentence joint information reflecting the speech-based non-linguistic information and the video-based non-linguistic information.

4. The method of claim 1, wherein the video generation step includes:
   a motion model generation step of generating a motion model moving according to the sentence-joint information;
   a background image synthesis step of synthesizing the background image on a background of the motion model; and
   an appearance image synthesis step of synthesizing the appearance image with the motion model.

5. The method of claim 4, wherein the appearance image synthesis step includes:
   when a part of a body of the conversation partner is not included in the appearance image, synthesizing all or a part of a conversation partner's appearance image or a basic appearance image previously stored on the motion model.

6. The method of claim 1, further comprising:
   before the recognition step, a speech language acquisition step of receiving, in real time, the video information generated by photographing the conversation partner who speaks a speech language by a terminal worn by the sign language user and the speech information generated by receiving the speech language delivered by sound, from the terminal; and
   after the video generation step, an augmented reality providing step of transmitting the sign language video to the terminal worn by the sign language user in real time to provide the same to the sign language user in an augmented reality method so that the sign language video generated in the video generation step is visually displayed to the sign language user.

7. The method of claim 1, wherein the word-joint information and the sentence-joint information include one or more pieces of unit-joint information including coordinates of multiple feature points of a human body necessary for reproducing gestures according to an order.

8. An apparatus for providing a sign language video reflecting an appearance of a conversation partner, the apparatus comprising:
a recognition processor configured to recognize, on the basis of video information and speech information, an appearance image and a background image from the video information and a speech language sentence from the speech information;
a joint information generation processor configured to acquire multiple pieces of word-joint information corresponding to the speech language sentence and sequentially input the word-joint information to a deep learning neural network to generate sentence-joint information; and
a video generation processor configured to generate a motion model on the basis of the sentence-joint information, and generate a sign language video in which the background image and the appearance image are synthesized with the motion model.

9. The apparatus of claim 8, wherein the joint information generation processor includes:
a joint information database configured to store word-joint information for reproducing a gesture representing a sign language word;
a joint information acquisition unit configured to acquire one or more word joint information corresponding to one or more sign language words having the same meaning as the speech language sentence from the joint information database based on a sign language grammar; and
a sentence-joint information generation unit configured to receive one or more pieces of word-joint information acquired in the joint information acquisition unit to generate the sentence-joint information by using a deep learning neural network learned with learning data of which input data includes word-joint information and correct data is sentence joint information.

10. The apparatus of claim 8, wherein the recognition processor is further configured to recognize speech-based non-linguistic information from the speech information, and recognize video-based non-linguistic information from the video information, and
wherein the sentence-joint information generation unit is configured to receive one or more pieces of word-joint information acquired in the joint information acquiring unit, the speech-based non-linguistic information, and the video-based non-linguistic information to generate the sentence-joint information, by using a deep learning neural network learned with learning data of which input data further includes speech-based non-linguistic information and video-based non-linguistic information, and correct data is the sentence joint information reflecting the speech-based non-linguistic information and the video-based non-linguistic information.

11. The apparatus of claim 8, wherein the video generation processor is configured to synthesize all or a part of a conversation partner's appearance image or a basic appearance image previously stored on the motion model when a part of the body of the conversation partner is not included in the appearance image.

12. The apparatus of claim 10, wherein the speech-based non-linguistic information is information quantified by recognizing at least one of an intonation, a pitch, a volume, and a speed of a speech language, and
wherein the video-based non-linguistic information is information quantified by recognizing at least one of a type of emotion, a balance of positive and negative, and an excitement on the basis of a facial expression or a gesture appearing in the appearance image of the video information.

13. The apparatus of claim 8, wherein the video information and the speech information are data provided by a terminal worn by a sign language user in real time, and generated by causing the terminal to photograph the conversation partner and record his/her voice, and
wherein the video generation processor is configured to provide the sign language video to the terminal worn by the sign language user so that the sign language video is reproduced in real time on the terminal worn by the sign language user.

14. A terminal for providing a sign language video reflecting an appearance of a conversation partner, the terminal comprising:
a speech language acquisition processor configured to generate video information by photographing a conversation partner that speaks a speech language, generate speech information by receiving a speech language transmitted by sound, and deliver the video information and the speech information to a sign language video providing apparatus in real time; and
an augmented reality providing processor configured to receive, in real time, a sign language video reflecting an appearance of the conversation partner generated on the basis of the video information and the sound information from the sign language video providing apparatus and visually displaying the sign language video to the sign language user in an augmented reality method,
wherein the sign language video is a video generated by allowing a recognition processor of the sign language video providing apparatus to recognize an appearance image and a background image from the video information and recognize a speech language sentence from the speech information the basis of the video information and the speech information,
the sign language video providing apparatus comprising:
a joint information generating processor configured to acquire multiple pieces of word-joint information corresponding to the speech language sentence from a joint information database and sequentially receive the word-joint information to a deep learning network to generate sentence-joint information; and
a video generation processor configured to generate a motion model on the basis of the sentence-joint information and synthesize the background image and the appearance image on the motion model.

* * * * *